United States Patent

Sastra

[11] Patent Number: 4,616,282
[45] Date of Patent: Oct. 7, 1986

[54] MAGNETIC RECORDING AND/OR PLAYBACK DEVICE AND MAGNETIC TRANSDUCING HEAD THEREFOR

[75] Inventor: Budiman Sastra, Eindhoven, Netherlands

[73] Assignee: U.S. Philips Corporation, New York, N.Y.

[21] Appl. No.: 805,397

[22] Filed: Dec. 4, 1985

Related U.S. Application Data

[63] Continuation of Ser. No. 727,617, Apr. 29, 1985, abandoned, which is a continuation of Ser. No. 640,633, Aug. 13, 1984, abandoned, which is a continuation of Ser. No. 333,360, Dec. 22, 1981, abandoned.

[30] Foreign Application Priority Data

Jan. 14, 1981 [NL] Netherlands ............ 8100143

[51] Int. Cl.$^4$ ............................................. G11B 5/22
[52] U.S. Cl. .................................................... 360/122
[58] Field of Search ........................ 360/110, 119, 122

[56] References Cited

U.S. PATENT DOCUMENTS 3,370,282 2/1968 Baldwin et al. ............... 360/122
3,416,148 12/1968 Berghaus et al. ................. 360/122

FOREIGN PATENT DOCUMENTS 1166831 4/1964 Fed. Rep. of Germany ...... 360/122

Primary Examiner—George G. Stellar
Attorney, Agent, or Firm—David R. Treacy

[57] ABSTRACT

A device for the magnetic recording and/or playing back of signals on a flexible recording medium (4) includes a magnetic transducing head (2) and transport and guide means (8, 8') for bringing successive parts of a flexible recording medium (4) in physical contact with a surface (1, 10) of the head. The head surface is curved and comprises a non-magnetic transducing gap (3) which intersects the direction of movement of the recording medium to obtain an optimum contact between recording medium (4) and head (2) at the area of the transducing gap (3).

The radius of curvature of the contact face (10) of the head (2) with the recording medium (4) has a maximum value at the area of the transducing gap (3) and decreases from the transducing gap (3) to both the part of the head where the recording medium moves towards the transducing gap and to the part of the head where the recording medium moves away from the transducing gap (3).

8 Claims, 5 Drawing Figures

MAGNETIC RECORDING AND/OR PLAYBACK DEVICE AND MAGNETIC TRANSDUCING HEAD THEREFOR

This is a continuation of application Ser. No. 727,617, filed Apr. 29, 1985 now abandoned, which was a continuation of application Ser. No. 640,633 filed Aug. 13, 1984, now abandoned, which was a continuation of application Ser. No. 333,360 filed Dec. 22, 1981, now abandoned.

BACKGROUND OF THE INVENTION

The invention relates to a device for the magnetic recording and/or playback of signals on a flexible recording medium by means of a magnetic transducing head, and more particularly to such a device having transport and guide means for bringing successive parts of the flexible recording medium in physical contact with a surface of the head, the surface being curved and comprising a non-magnetic transducing gap.

The invention further relates to a magnetic transducing head for the recording or playback of signals on a flexible recording medium which is passed over a curved contact face of the transducing head, the transducing head having a non magnetic transducing gap which intersects the direction of movement of the recording medium.

For a successful recording and playback of signals on flexible record carriers particularly at high densities, it is important in order to achieve a minimal signal loss that, in the area of the transducing gap, the spacing between the transducing head and the recording medium is minimum and preferably is zero. The area where the last-mentioned requirement is satisfied, (the so-called contact face) is here defined as the area where the distance between head and record carrier is smaller than approximately 3× the combined roughness of their surfaces (the transducing head then is of the "in-contact" type). At larger values, there is assumed to be an air film between the surfaces (the transducing head then is of the "fluid foil bearing" type).

In devices for recording and playback signals operating with flexible recording media, the interaction of a large number of parameters has a considerable effect on the predictability and possibility of maintaining such a minimum distance between head and recording medium. The parameters which influence this distance comprise inter alia the contour of the surface of the head facing the recording medium, the relative velocity between transducing head and recording medium, the tape tension, and the medium parameters such as the thickness, the modulus of elasticity and the transverse contraction (Poisson's ratio), which together determine the bending stiffness.

Magnetic heads are normally provided with circular profiles having a constant radius. The thickness $h_o$ of the air film between the head surface and the recording medium may be determined according to the theory of A. Eshel and H. G. Elrod jr. (see: "The Theory of the Infinitely Wide, Perfectly Flexible Foil, Bearing, *Journal of Basic Engineering, Transactions* A.S.M.E., series D, Vol. 87, 1965, pp 831–836) as follows:

$$\frac{h_o}{R} = K_H \frac{6\eta U}{T}^{\frac{2}{3}}$$

where:
- $\eta$ = viscosity of the medium in which the recording medium is moving (usually air);
- U = relative velocity of recording medium relative to the head;
- T = tape tension (= pulling force/tape width)
- R = radius of the head profile;
- $K_H$ = model constant dependent on the angle at which the tape is wrapped about the head, width and bending rigidity of the recording carrier.

One possibility of minimizing $h_o$ for a given recording and playback device and using a given magnetic tape as a recording medium (in which the viscosity $\eta$ of the medium in which the recording medium is moving, its velocity U, the tape tension T and the constant $K_H$ are fixed) is to make the radius of curvature R small. However, this has disadvantages.

The local contact pressure p for circular cylindrical profiles may be written as:

$$p = T/R$$

where T = tape tension; R = radius of the profile.

This means that as the radius of the profile decreases, the local contact pressure p becomes larger and this means that the detrition rate $(\delta h)/(\delta l)$, which may be written as:

$$\frac{\delta h}{\delta l} = K \cdot (p - p_o)^\alpha,$$

where
- h = local depth of detrition, l = passed tape length, K and $\alpha$ are model constants, increases with a reduction of R.

The gap depth is one of the most important parameters which vary during the detrition process. For a maximum transducing function, a small gap depth is desired. The larger the detrition rate, the sooner the depth of detrition will exceed the gap depth whereby the head becomes useless.

Although the maximum duration of use of the head can be extended by designing the head with a larger gap depth, this will be at the expense of the quality.

Thus, it is impossible with one degree of freedom (the radius R) to minimize both the thickness of the air film and the contact pressure independently of each other.

SUMMARY OF THE INVENTION

It is an object of the invention to provide a device of the kind mentioned in the opening paragraph having a transducing head in which the contact pressure in the area of the transducing gap may be reduced.

The invention provides a device as described in the opening paragraph which is characterized in that the radius of curvature of the contact face of the transducing head with the recording medium has a maximum value at the area adjacent the transducing gap and decreases, at least from a given point, continuously, on each side of the transducing gap in the directions of movement of the recording medium, so that the contact pressure at the area of the gap is smaller than at the locations which are furthest remote from the gap. The radius of curvature preferably decreases continuously from the transducing gap.

With this unique form of head profile, a minimum contact pressure at the area of the transducing gap is achieved so that the detrition rate is reduced at the transducing gap while, beyond the gap area, at the edges of the contact area where detrition plays a minor role, the contact pressure is large. It has been found that as a result of this (high) gradient in the contact pressure the air film collapses in the area of the transducing gap so that a good engagement of the record carrier against the head is obtained in the area of the transducing gap in spite of the low local contact pressure. Providing a large contact pressure outside the gap area (on the "shoulders") means in addition that the detrition area will reach the gap only after a long interval and, hence, decrease of the gap length will occur only after that interval. In the ideal situation, the required life time of the head will fall within this interval so that the device for recording and playing back signals can operate with a maximum transducing quality for the required life time.

The invention further provides a magnetic transducing head as described in the second paragraph characterized in that the radius of curvature of the contact face has a maximum value in the area adjacent to the transducing gap and a lesser value on each side of the area in the directions of movement of the recording medium.

BRIEF DESCRIPTION OF THE DRAWING

An embodiment of the invention will now be described, by way of example, with reference to the accompanying drawing, in which.

DESCRIPTION OF THE PREFERRED EMBODIMENTS

Figure 1:
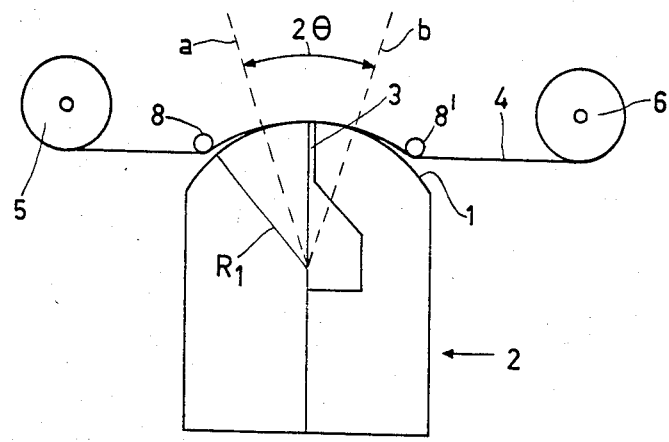
FIG. 1 is a side view of a magnetic recording and/or playback device including a known magnetic head having a constant radius of curvature of the tape contact surface.

Tape contact surface 1 of the known magnetic head 2 shown in a side view in FIG. 1 has a constant radius of curvature $R_1$. A transducing gap 3 is present in the center of the tape contact face 1. A magnetic record carrier 4 (in this case a magnetic tape) is transported from a supply reel 5 to a take-up reel 6. A tape-guide means 8,8' ensures that, in the sector bounded by the lines a and b, the magnetic tape 4 contacts the contact face 1 over the wrapping angle $2\theta$. The profile of the tape contact face 1 is circular and has a constant radius of curvature $R_1$.

For an optimum magnetic transducing performance there should be no air film (aerodynamic lubrication) present between tape and magnet gap. This implies that, in principle, detrition always occurs with an optimum contact.

Reduction of the rate of detrition by reducing the contact pressure is permissible only if said requirements remain satisfied. In the case of a circular profile, reduction of the rate of detrition may be achieved by increasing the radius. However, above a given radius an air film will form.

While neglecting the influence of frictional forces and using the following approximation for small wrap angles $$\frac{1}{R(x)} \simeq -\frac{d^2w}{dx^2}$$

where
R: local radius of curvature
w: movement of the tape out of its plane
x: place coordinate
the contact pressure p(x) can be written as $$p(x) = D\frac{d^4w}{dx^4} - T\frac{d^2w}{dx^2}$$

where
p(x) = the contact pressure distribution
w(x) = the profile of the contact face $$\left( D = \frac{E h^3}{12(1 - v^2)} \right) = \text{the bending rigidity}$$

T = the tape tension or $$p(x) = \frac{T}{R(x)} - D\frac{d^2\left(\frac{1}{R(x)}\right)}{dx^2}$$

with the above approximation, a circular profile of radius R can be approximated by $$w(x) = w_2 x^2$$

where $$w_2 \simeq -\frac{1}{2R}$$

and
p(x) = (T/R) = constant.
The following relation applies between half the contact length L and half the wrap angle $\theta$:

$$\frac{dw(L)}{dx} \simeq \tan \theta,$$

or
L = R tan $\theta \simeq R\theta$.
Herefrom, a maximum radius may also be derived.

$$R_{max} \simeq \frac{L_{max}}{\theta_{min}}$$

where
$2L_{max}$ = the maximum contact length (for example, the width of the head) and
$2\theta_{min}$ = minimum wrap angle.

EXAMPLE

For a head width of 8 mm, that is to say $L_{max}=4$ mm and a wrap angle $\theta$ of 10°=0.2 radian, it follows that $$R_{max} = \frac{4}{0.2} = 20 \text{ mm}.$$

Furthermore, it is to be noted that during the detrition process the contact length increases and the wrap angle decreases so that the radius increases, and hence, the air film begins to form.

With a profile of variable curvature, it is in principle possible to prescribe contact length, wrap angle and contact pressure on the gap independently of each other.

An arbitrary continuous profile may be written as follows.

$$w(x) = \sum_{i=0}^{\infty} w_i x^i$$

In the case of a symmetrical profile it follows that $$w_i = 0 \text{ for } i \text{ odd}.$$

The coefficients of the profile, $w_i$, $i =$ even, can be determined from the peripheral conditions. Restricting ourselves to 3 peripheral conditions:

$$\frac{dw(L)}{dx} = \tan \theta; \qquad 1.$$

$$p(0) = p_o, \text{ and} \qquad 2.$$

$$w(0) = 0, \qquad 3.$$

a profile of the shape satisfying the fourth degree equation $$w(x) = w_o + w_2 x^2 + w_4 x^4$$

will suffice, wherein $$w_o = 0;$$

$$w_2 = \frac{1}{2L} \left( \frac{-p_o L^3 + 6D \tan \theta}{6D + TL^2} \right), \text{ and}$$

$$w_4 = \frac{1}{4L} \frac{p_o L + T \tan \theta}{6D + TL^2}.$$

The local radius of curvature then is $$R(x) \simeq \frac{1}{2w_2 + 12w_4 x^2}.$$

and the associated contact pressure is $$p(x) \simeq (-12w_4 T)x^2 + (24w_4 D - 2w_2 T).$$

EXAMPLE

For $$P_o = -1670 \text{ N/m}^2;$$

$$L = 1 \text{ mm};$$

$$\theta = 10° = 0.2 \text{ radians};$$

$$T = 0.5 \text{ N}/0.000635 \text{ m};$$

$$h_f = 26 \text{ micron},$$

and $$E = 7 \times 10^9 \text{ N/m}^2$$

it follows that $$w_4 = 2.44 \times 10^7 \text{ 1/m}^3;$$

$$w_2 = 52.5 \text{ 1/m};$$

$$R(o) = -9.652 \times 10^{-3} \text{ m}; p(o) = -1670 \text{ N/m}^2;$$

$$R\left(\frac{L}{2}\right) = -5.64 \times 10^{-3} \text{ m}; p\left(\frac{L}{2}\right) = -7433 \text{ N/m}^2;$$

$$R(L) = -2.67 \times 10^{-3}; p(L) = -24725 \text{ N/m}^2.$$

Figure 2:
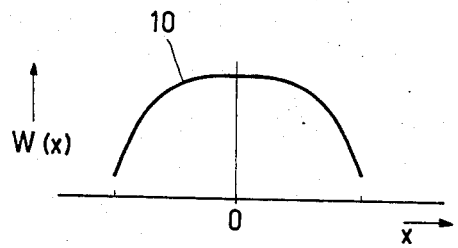
FIG. 2 is a diagram which shows the variation of the tape contact surface of a magnetic head suitable for a device according to the invention.
Figure 3:
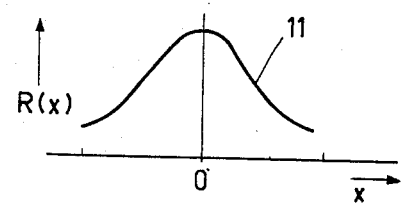
FIG. 3 is a graph which shows the value of the radius of curvature R in various areas of a magnetic head having a profile as shown in FIG. 2.
Figure 4:
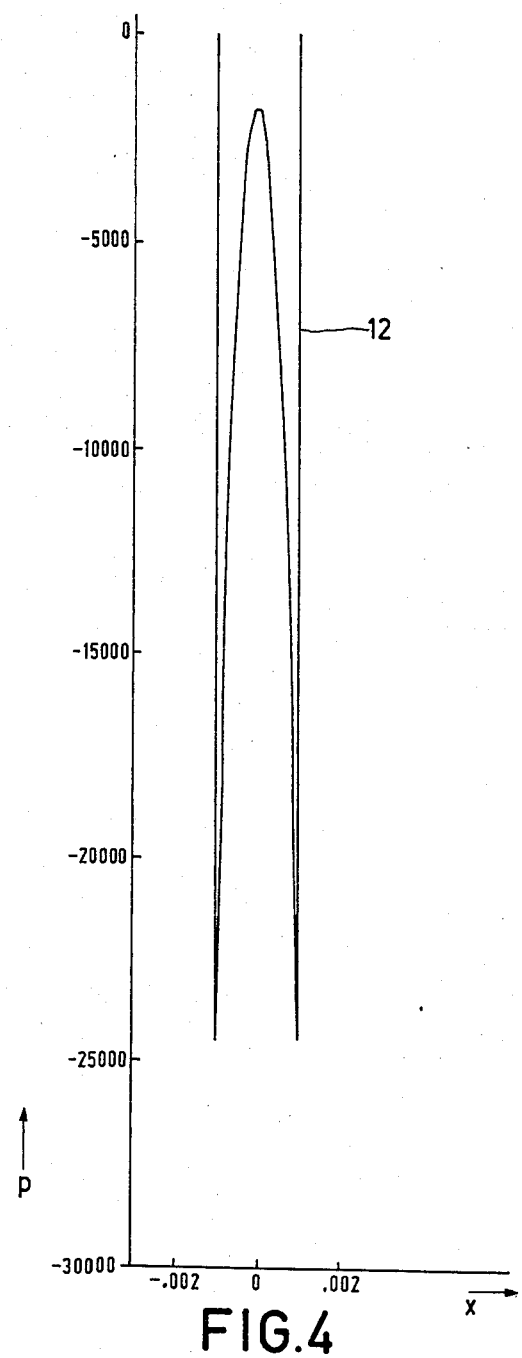
FIG. 4 is a graph which shows the contact pressure in various areas of a magnetic head having a profile as is shown in FIG. 2.

A profile of the shape $w(x) = w_o + w_2 x^2 + w_4 x^4$ is shown as the line 10 in FIG. 2. The local radius of curvature of this profile is shown as the line 11 in FIG. 3 and the local contact pressure is denoted by the curve 12 in FIG. 4. The build-up of two pressure maxima on either side of the gap position $x = 0$ and a pressure minimum at the area of the gap position can be recognized in FIG. 4.

A profile having a varying curvature can be compared in two manners with a circular profile:

1. the deviation from the nearest circle so as to specify the shape accuracy;
2. the air film and contact length if a circle of radius $R = T/p_o$ is used.

Deviation from the nearest circle

In order to simplify the calculations, we use the nearest parabola. This is permitted for small wrap angles because, in those cases, the difference between a parabola and a circle is negligible. We define $g(x) = g_o + g_2 x^2$ as the nearest parabola according to the criterion:

$$J = \frac{1}{L} \int_o^L [w(x) - g(x)]^2 dx.$$

The coefficients $g_o$ and $g_2$ follow from the conditions $$\frac{\delta J}{\delta g_0} = 0$$

$$\frac{\delta J}{\delta g_2} = 0,$$

so that $$g_0 = -\frac{3}{35} w_4 L^4$$

$$g_2 = w_2 + \frac{6}{7} w_4 L^2$$

In order to analyze the deviations, we define the differential function $$\Delta(x) = w(x) - g(x)$$

$$= w_4 x^4 + (w_2 - g_2) x^2 - g_0$$

The differential function proves to have the following zero points:

$$x^2 = \frac{g_2 - w_2}{2 w_4} \pm \sqrt{\left(\frac{w_2 - g_2}{2 w_4}\right)^2 + \frac{g_0}{w_4}}$$

$$= \frac{6}{14} L^2 \pm \frac{4}{14} L^2 \sqrt{\frac{6}{5}}$$

The differential coefficients prove to have the following properties:

$$\frac{\delta \Delta}{\delta x} = 4 w_4 \times \left[x^2 + \frac{w_2 - g_2}{2 w_4}\right]$$

$$\frac{\delta^2 \Delta}{\delta x^2} = 12 w_4 x^2 + 2 (w_2 - g_2)$$

$$\frac{\delta \Delta}{\delta x} = 0 \quad \text{for } x = 0$$
$$x = \pm \sqrt{\frac{g_2 - w_2}{2 w_4}} = \pm L \sqrt{\frac{6}{14}}$$

and $$\frac{\delta^2 \Delta}{\delta x^2} = -2 w_4 \cdot \frac{6}{7} L^2 < 0 \quad \text{for } x = 0$$

$$= \frac{24}{7} w_4 L^2 > 0 \quad \text{for } x = \pm L \sqrt{\frac{6}{14}}$$

that is to say in interval $-L \leq x \leq L$,
$\Delta(x)$ has an approximate minimum $$x = \pm L \sqrt{6/14}$$

$$\Delta = -\frac{24}{245} w_4 L^4$$

a local maximum $x = 0$ $$\Delta = \frac{3}{35} w_4 L^4$$

an approximate maximum at the edges:

$$x = L \quad \Delta = \frac{8}{35} w_4 L^4$$

Figure 5:
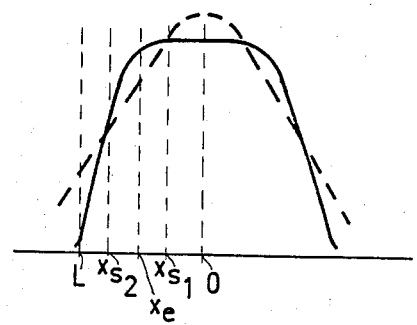
FIG. 5 is a diagram which shows the deviation of a head profile according to the invention with respect to the nearest parabola.

For the chosen example, it follows (see FIG. 5):

$x = 0$     $\Delta(0) = 2.1 \times 10^{-6}$ m $x_{s1} = 0.34 \times 10^{-3}$ m    $\Delta(x_{s1}) = 0$ $x_e = 0.655 \times 10^{-3}$ m    $\Delta(x_e) = -2.4 \times 10^{-6}$ m $x_{s2} = 0.86 \times 10^{-3}$ m    $\Delta(x_{s2}) = 0$ $x = L = 10^{-3}$ m    $\Delta(L) = 5.6 \times 10^{-6}$ m Over a contact length of 1 mm, the profile w(x) has a deviation of $\simeq 2.1$; 2.4 and 6 microns relative to the nearest circle with $R \simeq 7$ mm (or relative to the parabola defined by $g(x) = -2.1 \times 10^{-6} + 73.4 x^2 [1/m]$).

What is claimed is:

1. A device for recording signals on and/or reproducing signals from a flexible magnetic tape, comprising:
  a magnetic head including a tape contact face, the tape contact face being curved along a contact length and having a transducing gap, and
  transport and guide means for physically contacting a moving flexible magnetic tape with the tape contact face over a wrapping angle of the tape with the tape contact face, the tape having a bending rigidity D and a tension T during operation of the device,
  characterized in that the tape contact face has a continuously varying local radius of curvature which has a maximum value substantially at the gap and which, on each side of the gap, decreases continuously from the maximum to a minimum value at a location remote from the gap,
  the local radius of curvature being determined according to a relationship:

$$R(x) \simeq \frac{1}{2 w_2 + 12 w_4 x^2}$$

wherein R(x) is the value of the local radius of curvature at a distance x from the gap, $$w_2 = \frac{1}{2L} \left(\frac{-p_0 L^3 + 6D \tan \theta}{6D + TL^2}\right),$$

$$w_4 = \frac{1}{4L} \frac{p_0 L + T \tan \theta}{6D + TL^2},$$

$1L$ is the contact length, $p_o$ is a contact pressure of the tape on the tape contact face at substantially the gap, and $2\theta$ is the wrapping angle of the tape with the tape contact face, whereby detrition of the head at the gap during normal operation of the device is substantially reduced.

2. A device as claimed in claim 1, characterized in that the maximum value of the local radius of curvature is in a range of between two and 10 times the minimum value.

3. A device as claimed in claim 1, characterized in that the maximum and the minimum values of the local radius of curvature are in a range of between two mm and 20 mm.

4. A magnetic head, comprising:
  pole pieces forming a magnetic tape contact face, the contact face being curved and including a transducing gap,
  characterized in that the tape contact face has a continuously varying local radius of curvature which has a maximum value substantially at the gap and which, on each side of the gap, decreases continuously from the maximum to a minimum value at a location remote from the gap, the maximum value being approximately $9.6 \times 10^{-3}$ m and the minimum value being approximately $2.6 \times 10^{-3}$ m.

5. A device for recording signals on and/or reproducing signals from a flexible magnetic tape, comprising:
  a magnetic head including a curved face having a transducing gap, and
  transport and guide means for physically contacting a moving flexible magnetic tape with at least a portion of said curved face over a wrapping angle of the tape, said portion being a tape contact face,
  characterized in that said tape contact face has a varying local radius of curvature which has a maximum value at the gap region and which, on each side of the gap, decreases continuously from said maximum value to a minimum value at a location remote from said gap, whereby the contact pressure at the area of the gap is smaller than the contact pressure at locations remote from the gap.

6. A device as claimed in claim 5, characterized in that said locations remote from the gap are edges of the tape contact face.

7. A device as claimed in claim 6, characterized in that the tape contact face has a convex curvature defined by a fourth-degree equation describing the distance from a plane tangent to the face of the gap, as a function of the distance from the gap.

8. A device as claimed in claim 5, characterized in that the tape contact face has a convex curvature defined by a fourth-degree equation describing the distance from a plane tangent to the face of the gap, as a function of the distance from the gap.

* * * * *

UNITED STATES PATENT AND TRADEMARK OFFICE
CERTIFICATE OF CORRECTION

PATENT NO. : 4,616,282

DATED : October 7, 1986

INVENTOR(S) : BUDIMAN SASTRA

It is certified that error appears in the above-identified patent and that said Letters Patent is hereby corrected as shown below:

<u>IN THE CLAIMS</u>

Claim 1, column 8, line 30, change "1L" to --2L--.

Signed and Sealed this

Twenty-seventh Day of January, 1987

*Attest:*

DONALD J. QUIGG

*Attesting Officer*     *Commissioner of Patents and Trademarks*